TOLL COMPUTER ASSEMBLY WITH CUTTER DRUM CLUTCHED TO COMPUTER DRUM BY PRESENCE OF TAPE

Filed Feb. 18, 1963 3 Sheets-Sheet 1

Eldon E. Ehinger
INVENTOR.
BY Clarence A. O'Brien
and Harvey B. Jacobson
Attorneys Eldon E. Ehinger
INVENTOR.

BY Clarence A. O'Brien
and Harvey B. Jacobson
Attorneys

Eldon E. Ehinger
INVENTOR.
BY Clarence A. O'Brien
and Harvey B. Jacobson
Attorneys United States Patent Office 3,143,020
Patented Aug. 4, 1964

3,143,020

TOLL COMPUTER ASSEMBLY WITH CUTTER DRUM CLUTCHED TO COMPUTER DRUM BY PRESENCE OF TAPE

Eldon E. Ehinger, Centreville, Va.

Filed Feb. 18, 1963, Ser. No. 259,271
5 Claims. (Cl. 83—286)

The present invention generally relates to an exact toll computer and collector assembly for use with an overhead automobile handling apparatus such as that disclosed in copending application Serial No. 860,136, for Automobile Handling Apparatus, now U.S. Patent No. 3,101,677 issued Aug. 27, 1963 and other performing services where a current and guaranteed payment is desirable and necessary.

An object of the present invention is to provide a toll computing assembly incorporating a tear-off type of tape which serves as a driving interconnection means between a pair of drums, one being a driven drum and one being an idling drum which exerts pressure against the driven drum with the driven drum being also provided with an inner drum connected thereto by an electrically energized clutch mechanism with all of the structure satisfactorily or unsatisfactorily operating in response to the presence or absence of the toll tape thereby insuring that the required amount of toll tape has been inserted and consumed, before a satisfactory service or automatic transit is completely rendered.

Another object of the present invention is to provide a concentric computer drum and cutter drum having an electrically operated latch mechanism therebetween whereby the computer drum will operate at all times during operation of the assembly but the outer drum will be locked thereto only when the electrically operated latch is rendered effective.

Another object of the present invention is to provide a toll computing and collecting assembly which is simple in construction, easy to operate, easy to install and relatively inexpensive to maintain and manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3, 4:
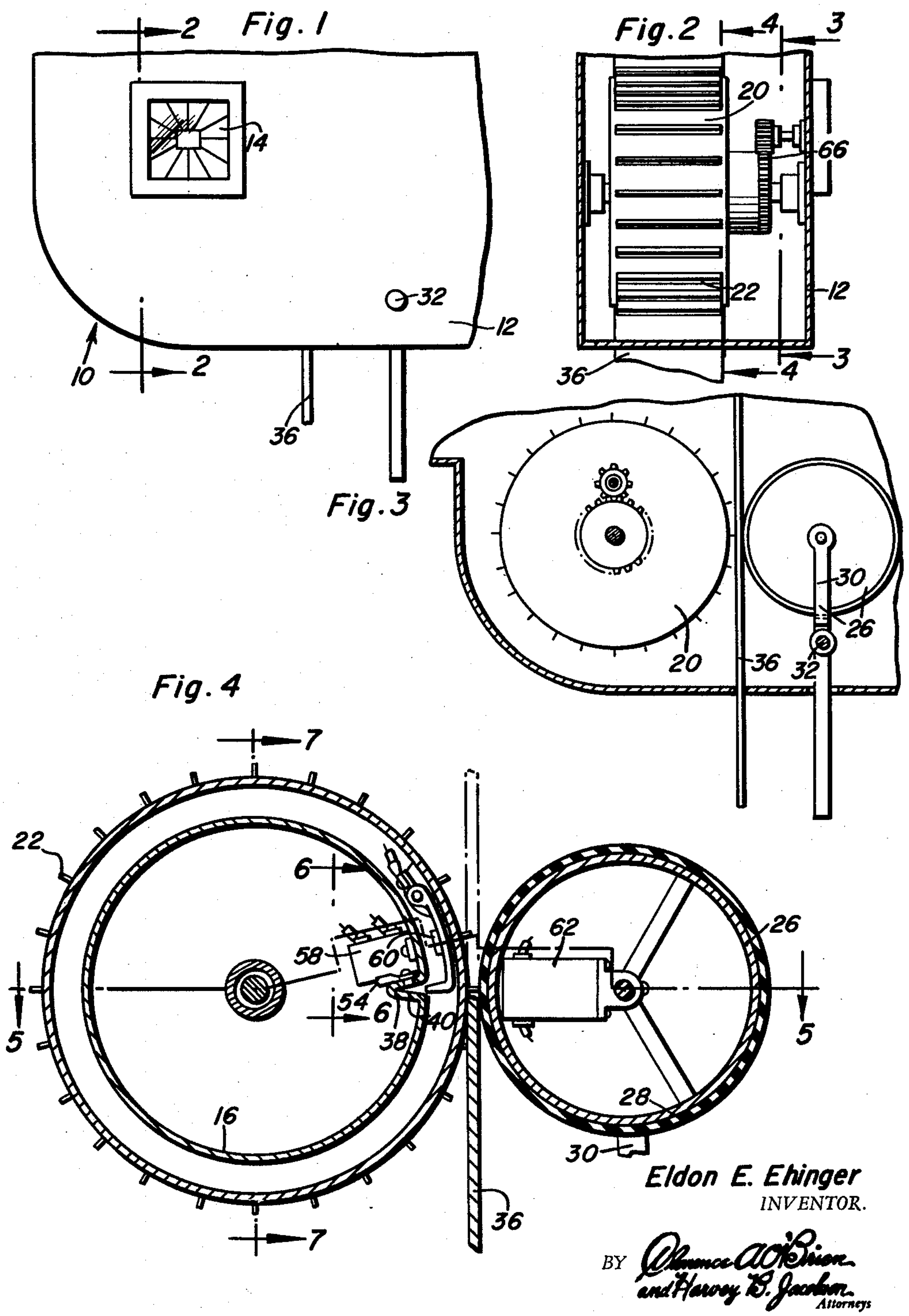
FIGURE 1 is an elevational view of the toll computing assembly of the present invention.
FIGURE 2 is a detail sectional view taken substantially upon a plane passing along section line 2—2 of FIGURE 1 illustrating the arrangement of the component parts.
FIGURE 3 is a detail sectional view taken substantially upon a plane passing along section line 3—3 of FIGURE 2 illustrating further structural details of the component parts.
FIGURE 4 is an enlarged sectional view similar to FIGURE 3 but illustrating in detail the component structure of the inner computer drum, the outer cutter drum and the pressure roller and the association of the control tape therebetween.
Figure 5:
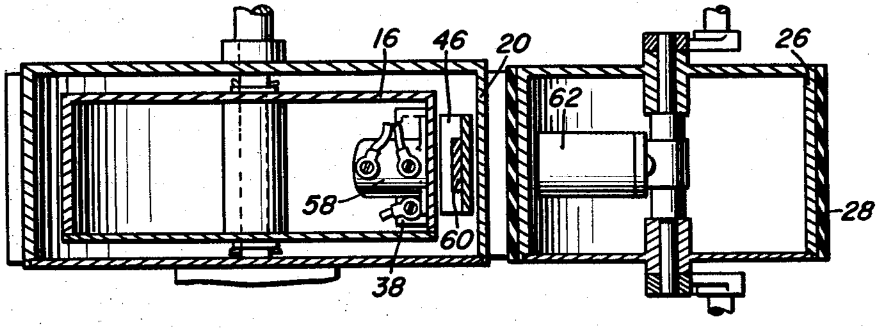
FIGURE 5 is a plan sectional view taken substantially upon a plane passing along section line 5—5 of FIGURE 4.
Figure 6:
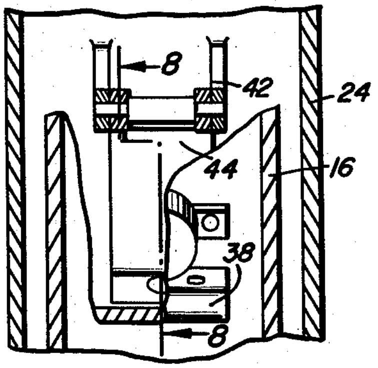
FIGURE 6 is a detail sectional view taken substantially upon a plane passing along section line 6—6 of FIGURE 4.
Figure 7:
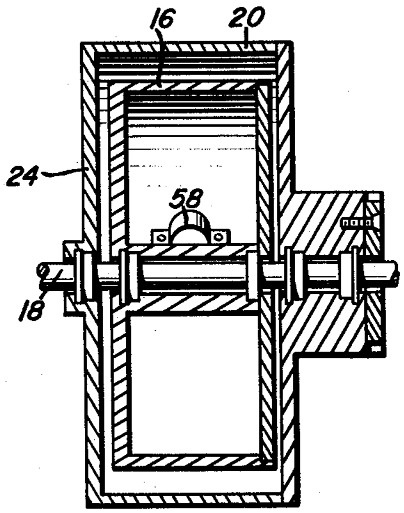
FIGURE 7 is a detail sectional view taken substantially upon a plane passing along section line 7—7 of FIGURE 4.
Figure 8:
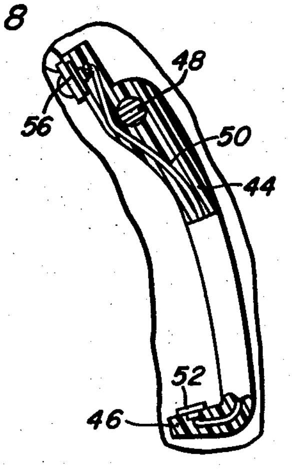
FIGURE 8 is a detail sectional view of the latch mechanism forming a clutch between the computer drum and the cutter drum illustrating the contents mounted thereon with the view being taken substantially along section line 8—8 of FIGURE 6.

Referring now specifically to the drawings, the numeral 10 generally designates the toll computing assembly of the present invention which includes a housing 12 of any convenient construction with a computing element such as a clock 14 or the like mounted therein. The computing element 14 drives an inner drum 16 carried on a central shaft 18. The inner drum 16 is in concentric spaced relation interiorly of a cutter or outer drum 20 having a plurality of radial blades 22 projecting therefrom. The drum 20 is supported by end walls 24 also carried by the shaft 18. Disposed in opposing relation to the outer drum 20 is a pressure drum or roller 26 having a covering of resilient material 28 thereon. The pressure roller 26 is carried by an elongated supporting arm 30 swingably mounted by a pivot shaft 32 on the casing 12 and held by springs or other means to a proper tension against the cutter drum 20, so as to perforate the toll tape as it is either manually forced or automatically drawn between said drums. This enables the transit or service to start and continue while the cutter drum is being manually forced by the insertion of the toll tape, to a currently paid-up position in relation to the computing drum, whereby, by virtue of the electrically energized clutch mechanism, it becomes secured to the computing drum to automatically consume the toll tape as it currently becomes due, while also making and keeping the satisfactory service or transit completing contact, until such time again as the tape is manually torn off at perforations and remainder removed or the operation or transit has been satisfactorily completed and the remaining unused portion of tape automatically cut off and returned for future use. This enables a supply of toll tape to be provided and employed without the necessity of paying a pre-computed charge for each indefinite use of a service, or toll at a toll gate whenever a vehicle enters or leaves the automobile handling apparatus.

The inner drum 16 is provided with a radially inwardly extending indentation 38 forming a keeper socket 40 thereon. Pivotally mounted on the outer drum 20 by virtue of a pair of mounting lugs 42 is a hook or clutch 44 having an inturned tapered end portion 46 adapted to be received within the socket 40. The hook 44 is pivotally mounted on a pivot pin 48 extending between the lugs 42 and the hook 44 is constructed of insulating material having a conductor 50 extending therethrough and provided with a contact plate 52 in the form of a button-like member carried by the interior tapered surface of the inturned end portion 46. The button contact 52 is adapted to come into electrical contact with a contact 54 carried by a complementary surface of the socket 40. Thus, as the tapered inturned end 46 engages in the socket 40, an electrical connection will be completed between the contacts 52 and 54 respectively. The other end of the conductor 50 is provided with a terminal adapter 56 for connection with electrical wiring that provides the satisfactory completion of service or the automatic release of an automobile from suspended transit.

Also mounted on the interior of the inner drum 16 is an electromagnet 58 for association with a plate 60 mounted on the latch or hook 44 so that when the electromagnet 58 is energized, it will attract the plate 60 which is of magnetic material towards the core thereof thereby drawing the hook 44 towards the inner drum 16 for bringing the inturned end portion 46 of the hook 44 into engagement and registry with the socket 40 as cutter drum and computer drum become current.

Figure 9:
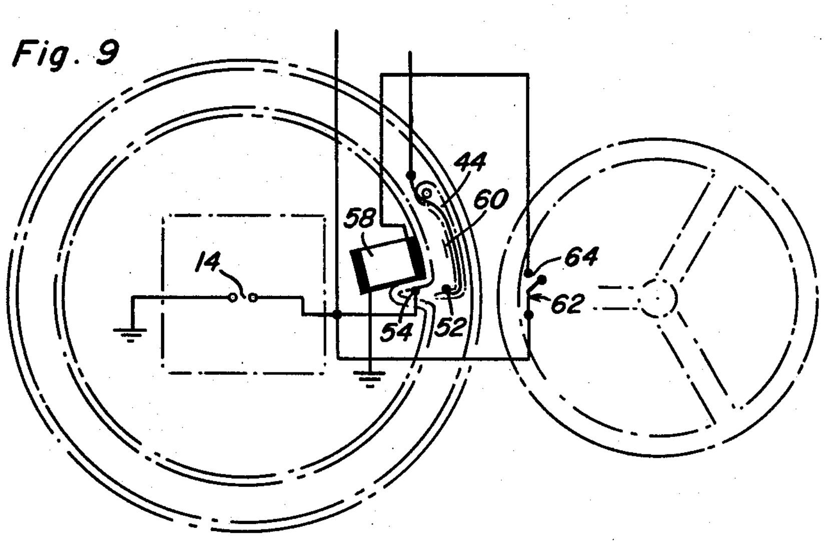
FIGURE 9 is a schematic electrical diagram illustrating the electrical association of the component parts.

Also mounted in the drum 26 is a toll tape senser 62 which has contacts 64 therein which are closed when the toll tape 36 is inserted thus closing the circuit through the electromagnet 58 as illustrated in FIGURE 9. When the electromagnet is energized, the hook or latch 44 closes the circuit to the satisfactorily service completing circuit or automatic transit releasing circuit.

Accordingly, with this arrangement, the toll tape computing assembly will compute the correct toll and also provide a mechanism for collecting the correct toll from the tape and returning the unused portion of the tape to the user thereof.

The inner drum 16 is powered by a drive assembly 64 for rotation in direct relation to the miles of travel, the time of operation or other units of computation of cost of a toll. The exterior cutter drum 16 encloses the inner drum and is rotatable by means of either manually forced toll tape or by the contact of the latch arm 44 to the inner drum 16. The blades 22 on the exterior cutter drum provide perforating traction and a tape cutting function. The tape 36 is preferably of a semi-rigid magnetized strip which can be purchased in rolls similar to roll film or other similar strips which may be purchased in predetermined length increments.

The pressure drum 26 has the toll tape magnetic sensor 62 therein and the sensor is fixed to the shaft so that it will always remain directly opposite of the cutter drum 20 so that the contacts 64 will be closed by the presence of the magnetic toll tape. Thus, at all times that a toll tape is in close proximity to it as between the cutter drum and the pressure drum, the contacts 64 will be closed for energizing the electromagnet 58. When the electromagnet 58 is energized, it will pull the dog or latch 44 into the socket thus making contact between the contacts 52 and 54. Thus, the inner drum will become locked to the cutter drum for rotating both drums in unison and at the same time and all satisfactory and completing circuits will be actuated. The contacts 52 and 54 remain in closed position only for as long as the engaging dog or arm 44 of the cutter drum is held in proper engagement with the constantly revolving inner drum thus satisfactorily energizing or operating the mechanism for which a charge is being made.

Accordingly, it will be seen that the inner drum immediately starts and continues to compute the toll throughout any given operation whether the toll tape 36 is inserted or not. However, when the toll tape is inserted as it must always be or the operation will be incomplete, enough must be inserted to revolve the cutter drum into the proper paid-up relation with the inner or computing drum before the drums will make an automatic consuming and operation completing contact.

Figure 10:
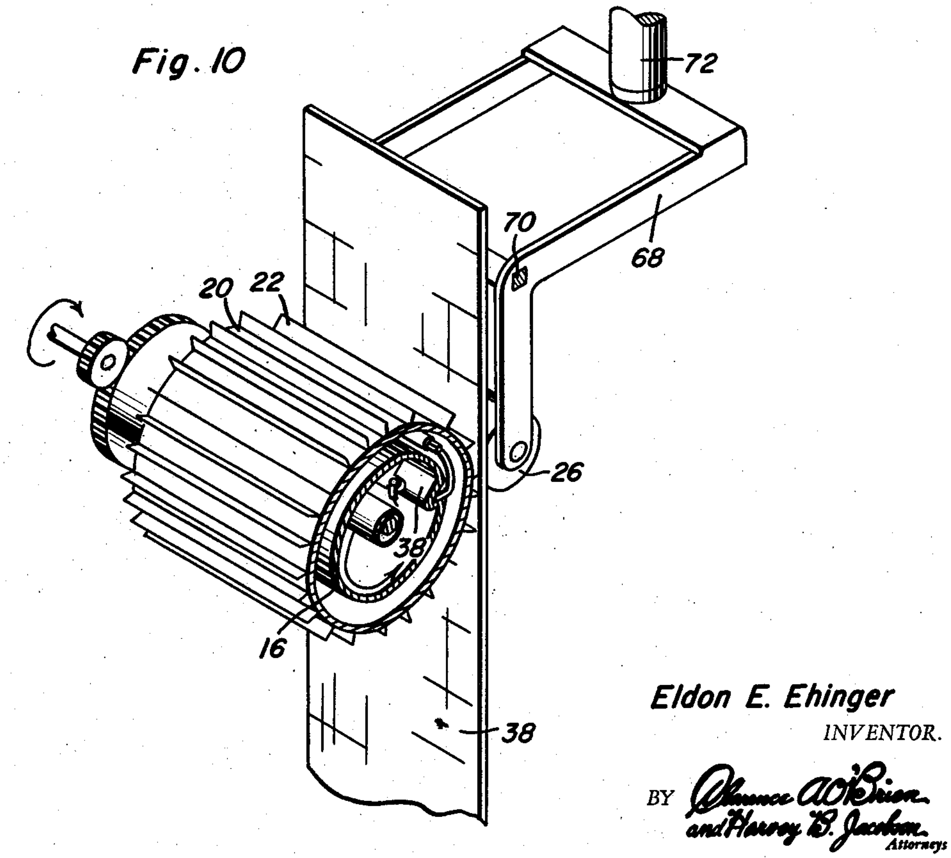
FIGURE 10 is a perspective view illustrating the construction and relationship of the component parts of the invention.

The variable pressure drum which is directly connected to the completion of the operation acts to cut-off the toll tape and release the unused portion as that operation is completed and this may be accomplished either by a manual operation or by an electrical or mechanical connection with the mechanism to automatically force the pressure drum inwardly towards the cutter drum when the operation has been completed. FIGURE 10 illustrates schematically an arrangement in which the pressure drum 26 is mounted on an L-shaped supporting bracket 68 having the apex thereof pivotally supported as at 70 and one end thereof connected to an actuating arm 72 which may be either electrically or mechanically operated for automatically cutting off the toll tape at the point of completion of the operation which occurs when the vehicle controlled by the toll tape is discharged from the automobile handling apparatus.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A toll computer assembly comprising a rotatable cutter drum, a rotable pressure drum disposed in side-by-side relation with the cutter drum and rotatable about an axis parallel thereto, means connected to the pressure drum for moving the pressure drum towards and away from the cutter drum for cutting a toll tape disposed between the cutter drum and pressure drum, sensing means mounted on the pressure drum for sensing the presence of a toll tape between the cutter drum and pressure drum, a computer drum disposed within the cutter drum for driving the cutter drum and consuming the toll tape therebetween, and means interconnecting the computer drum and cutter drum in response to the presence of tape between the cutter drum and pressure drum for interlocking the computer drum with the cutter drum for consuming the proper quantity of toll tape.

2. The structure as defined in claim 1 wherein said computer drum is disposed concentrically within the cutter drum and provided with a socket in the exterior surface thereof, said means interconnecting the computer drum and cutter drum including a pivotal hook arm mounted on the cutter drum, an electromagnet mounted on the computer drum, said electromagnet being actuated in response to the means sensing the presence and absence of a toll tape for urging the hook into interlocking engagement with the computer drum thereby interconnecting the computer drum with the cutter drum.

3. The structure as defined in claim 2 wherein said cutter drum is cylindrical and provided with a plurality of radial blades projecting therefrom for perforating the toll tape and for cutting the toll tape when the pressure drum is moved towards the cutter drum.

4. The structure as defined in claim 3 wherein said toll tape is in the form of a magnetic tape, said toll tape sensing means including a sensor element mounted stationarily in relation to the pressure drum for constant orientation in opposition to the cutter drum at the point of contact between the cutter drum and pressure drum.

5. The structure as defined in claim 4 wherein said means interconnecting the computer drum and the cutter drum includes an electrical circuit closing a circuit that satisfactorily carries through the operation to its completion while consuming the proper quantity of toll tape.

References Cited in the file of this patent

UNITED STATES PATENTS

| | | |
|---|---|---|
| Re12,892 | Gallagher | Dec. 8, 1908 |
| 1,446,281 | Turner | Feb. 20, 1923 |
| 2,407,641 | Anderson | Sept. 17, 1946 |
| 3,074,525 | Quinn | Jan. 22, 1963 |